United States Patent [19]

Sakata

[11] Patent Number: 5,249,641
[45] Date of Patent: Oct. 5, 1993

[54] ANTI-SKID CONTROL SYSTEM FOR A REAR DRIVE VEHICLE

[75] Inventor: Yasunori Sakata, Toyota, Japan

[73] Assignee: Aisin Seiki Kabushiki Kaisha, Kariya, Japan

[21] Appl. No.: 925,633

[22] Filed: Aug. 7, 1992

[30] Foreign Application Priority Data

Aug. 10, 1991 [JP] Japan .................... 3-224613

[51] Int. Cl.⁵ .................. B60K 28/16; B60T 8/58
[52] U.S. Cl. ............................ 180/197; 180/233; 180/244; 180/247; 303/97; 303/100; 303/103; 303/106; 364/426.02
[58] Field of Search ............... 180/197, 233, 247, 244, 180/140; 364/426.01, 426.02; 303/95, 96, 97, 100, 103, 104, 105, 106, 24.1

[56] References Cited

U.S. PATENT DOCUMENTS

| | | | |
|---|---|---|---|
| 4,762,376 | 8/1988 | Matsubara | 180/233 |
| 4,859,002 | 8/1989 | Yoshino | 303/100 |
| 4,932,726 | 6/1990 | Iwata et al. | 303/106 |
| 4,962,970 | 10/1990 | Jonner et al. | 303/100 |
| 5,019,985 | 5/1991 | Yasuno et al. | 180/244 |
| 5,028,095 | 7/1991 | Okubo | 303/100 |
| 5,056,354 | 10/1991 | Kuwana et al. | 73/9 |
| 5,193,061 | 3/1993 | Tsuyama et al. | 180/197 |
| 5,193,888 | 3/1993 | Okazaki et al. | 180/197 |
| 5,198,982 | 3/1993 | Kobayashi | 180/197 |
| 5,201,382 | 4/1993 | Edahiro et al. | 180/197 |
| 5,201,570 | 4/1993 | Heren et al. | 180/197 |

FOREIGN PATENT DOCUMENTS 62-155160 7/1987 Japan .

Primary Examiner—Mitchell J. Hill
Attorney, Agent, or Firm—Sughrue, Mion, Zinn, Macpeak & Seas

[57] ABSTRACT

The invention is directed to an arrangement for controlling a braking force applied to each of road wheels of a rear drive vehicle depending upon a braking condition, with a hydraulic braking pressure supplied to each of wheel brake cylinders through pressure control valves respectively. The pressure control valves are controlled by the braking force controller into which output signals of wheel speed sensors are fed. In a first determination unit, it is determined if at least one of the front road wheels is on a road surface of a coefficient of friction lower than a predetermined value, and determined if the front wheel speed of one of the front road wheels has reached to a peak wheel speed. And, in a second determination unit, it is determined if a difference between the front wheel speed and rear wheel speed is less than a predetermined speed. When it is determined that at least one of the front road wheels is on the road surface of the low coefficient of friction and the front wheel speed has reached to the peak wheel speed, and that the difference between the front and rear wheel speeds is less than the predetermined speed, an asynchronous control unit prohibits the braking force controller from synchronously controlling the braking force applied to the front road wheels.

4 Claims, 6 Drawing Sheets

ANTI-SKID CONTROL SYSTEM FOR A REAR DRIVE VEHICLE

BACKGROUND OF THE INVENTION

1. Field of the Invention

The present invention relates to an anti-skid control system for use in an automotive vehicle for driving rear road wheels, and more particularly to an anti-skid control system for controlling braking force applied to front and rear road wehicle in braking operation to prevent the road wheels from being locked.

2. Description of the Prior Art

In order to prevent road wheels from being locked, there has been employed an anti-skid control system which controls the braking force by decreasing, increasing, or holding a hydraulic braking pressure supplied to each wheel brake cylinder operatively connected to each road wheel.

According to the anti-skid control system, in general, detected is a rotational speed of each road wheel or wheel speed. On the basis of the maximum value of the wheel speeds of the four road wheels, an estimated vehicle speed is calculated, and the hydraulic braking pressure in each wheel brake cylinder is controlled in response to a difference between each wheel speed and the estimated vehicle speed, so as to obtain the maximum coefficient of friction. In the anti-skid control system, as disclosed in Japanese Patent Laid-open publication No. 62-155160 for example, it has been so arranged that the hydraulic braking pressure in the wheel cylinder is increased with intervals, i.e., a pulse increasing mode signal is output, when a high peak of the wheel speed is caused.

In the anti-skid control system for use in a vehicle for driving rear road wheels, generally it is so arranged that so called independent control mode is employed for each of the front road wheels and so called low-select simultaneous control mode is employed for the rear road wheels. According to the low-select simultaneous control mode, a braking force, which is to be applied to one of the rear road wheels rotating at the lower speed and having a tendency to be locked first, is applied to both of the right and left rear road wheels simultaneously. Consequently, in the case where the vehicle having that anti-skid control system is running on a road of a low coefficient of friction, if the anti-skid control starts with a shift gear engaged when the vehicle is in so called engine-braking condition, the wheel speeds of the rear road wheels will be hardly recovered by reducing the hydraulic braking pressure in the wheel brake cylinders of the rear road wheels. Since the estimated vehicle speed used for the above-described anti-skid control system is calculated on the basis of the maximum wheel speed of the four road wheels, if the right and left front road wheels are also rotated synchronously in the above condition, wheel speeds of both front road wheels will be reduced. Consequently, the estimated vehicle speed is set to be low, so that all the wheel speeds of the four road wheels will be reduced to cause the road wheels to be locked rapidly.

FIG. 7 shows the anti-skid control operation of the above-described prior art. When pulse mode signals are output at a position (A) simultaneously with respect to the right and left front road wheels FR, FL, both wheels FR, FL rotate synchronously, so that the wheel speed Vwf of the wheels FR, FL vary as indicated by a solid line in FIG. 7, wherein V indicates an actual vehicle speed. Therefore, as indicated by a broken line, the estimated vehicle speed Vs is low at the position (A) as in a state at the time of initiation of the anti-skid control. Consequently, the wheel speed Vwr (as indicated by two-dotted chain line) of the rear road wheels RR, RL will be reduced less than the estimated vehicle speed Vs, so that the road wheels RR, RL will be locked at a position (B). Then, the road wheels FR, FL also will be locked.

SUMMARY OF THE INVENTION

Accordingly, it is an object of the present invention to provide an anti-skid control system for use in a rear wheel drive automotive vehicle, which prevents front road wheels on a road of a low coefficient of friction from being locked rapidly to ensure a stable braking operation.

In accomplishing the above and other objects, an anti-skid control system for controlling a braking force applied to road wheels of an automotive vehicle for driving right and left road wheels at a rear side of the vehicle comprises wheel brake cylinders which are operatively connected to right and left road wheels, respectively, at front and rear sides of the vehicle for applying braking force thereto, a hydraulic pressure generator for supplying a hydraulic braking pressure in each of the wheel brake cylinders, actuating means disposed in each hydraulic circuit communicating the hydraulic pressure generator with each of the wheel brake cylinders for individually controlling the hydraulic braking pressure in each of the wheel brake cylinders, and wheel speed detecting means for detecting a front wheel speed of each of the front road wheels and a rear wheel speed representative of wheel speeds of the rear road wheels, and providing output signals corresponding to the front wheel speed and rear wheel speed. The anti-skid control system is provided with braking force control means for controlling the actuating means in response to the output signal of the wheel speed detecting means to control the braking force applied to the road wheels. First determination means is provided for determining if at least one of the front road wheels is on a road surface of a coefficient of friction lower than a predetermined value and determining if the front wheel speed of one of the front road wheels has reached to a peak wheel speed. And, second determination means is provided for determining if a difference between the front wheel speed and the rear wheel speed is less than a predetermined speed. Further, asynchronous control means is provided for prohibiting the braking force control means from synchronously controlling the braking force applied to the front road wheels, when the first determination means determines that at least one of the front road wheels is on a road surface of the coefficient of friction lower than the predetermined value and that the wheel speed of one of the front road wheels has reached to the peak wheel speed, and the second determination means determines that a difference between the front wheel speed and the rear wheel speed is less than the predetermined speed.

In the above-described anti-skid control system, the asynchronous control means preferably makes the braking force control means to control the actuating means to hold the hydraulic braking pressure in the wheel brake cylinder operatively connected to one of the front road wheels, until the actuating means terminates increasing the hydraulic braking pressure in the wheel brake cylinder operatively connected to the other of the front road wheels.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
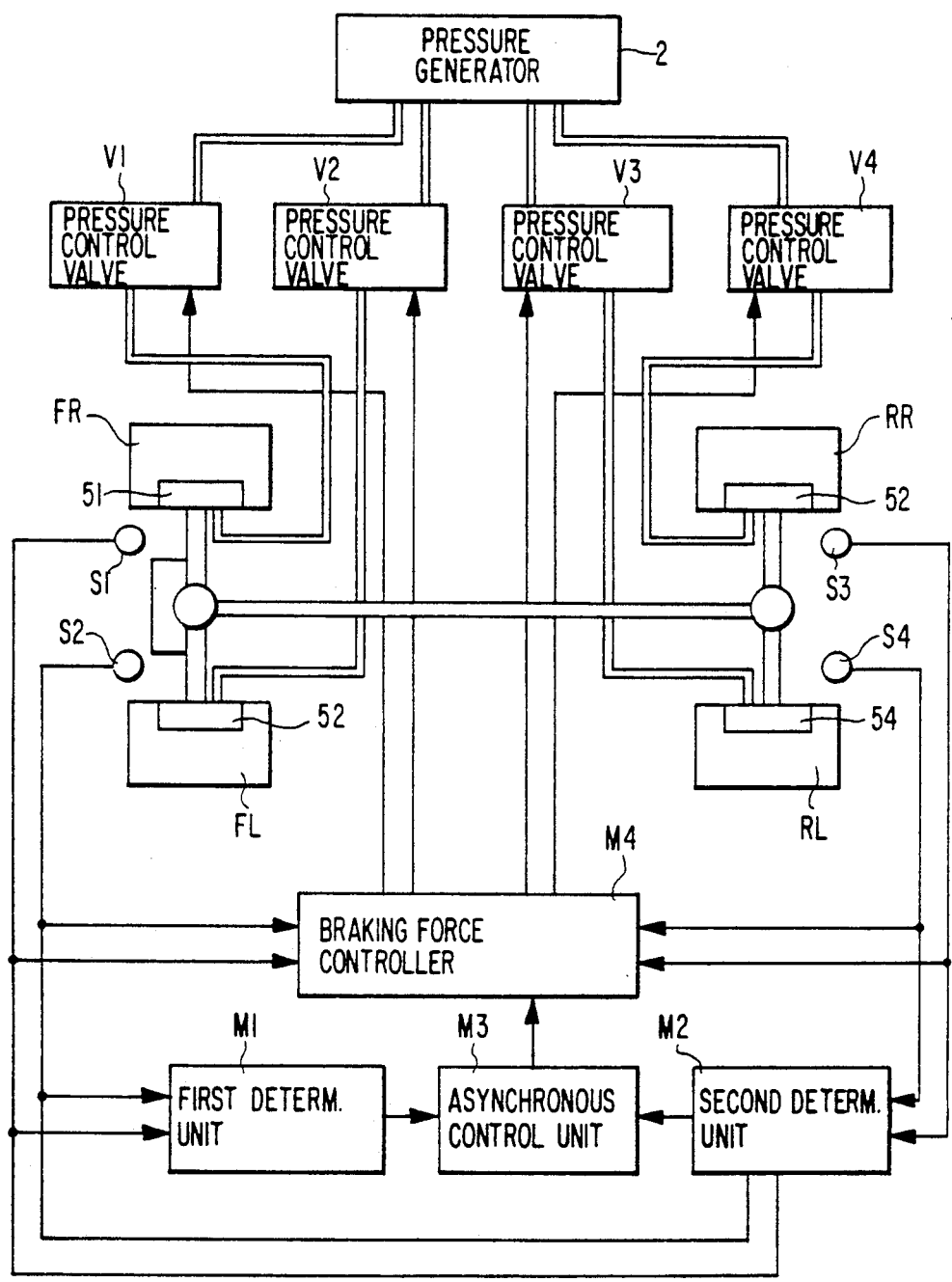
FIG. 1 is a general block diagram illustrating an anti-skid control system according to the present invention.

Referring to FIG. 1, there is schematically illustrated an anti-skid control system according to the present invention, which controls a braking force applied to each of right and left front road wheels FR, FL and right and left rear road wheels RR, RL of a vehicle individually depending upon a braking condition.

In this anti-skid control system, it is so arranged that when the hydraulic pressure generator 2 is operated, a hydraulic braking pressure is supplied to each of wheel brake cylinders 51-54 through pressure control valves V1-V4, so that a braking force is applied to each of the road wheels FR, FL and RR, RL. And, a front wheel speed of each of the front road wheels FR, FL is detected by wheel speed sensors S1, S2 respectively. Also, wheel speeds of the rear road wheels RR, RL are detected by wheel speed sensors S3, S4 to produce a rear wheel speed representative of the wheel speeds, as an average thereof for example, in this embodiment. The pressure control valves V1-V4 are controlled by the braking force controller M4, into which output signals of the wheel speed sensors S1-S4 are fed. In a first determination unit M1, it is determined if at least one of the front road wheels FR, FL (e.g., FR) is on a road surface of a coefficient of friction lower than a predetermined value and determined if the front wheel speed of one of the front road wheels (FR) has reached to a peak wheel speed. And, in a second determination unit M2, it is determined if a difference between the front wheel speed (FR) and the rear wheel speed is less than a predetermined speed. When it is determined that at least one of the front road wheels (FR) is on the road surface of the coefficient of friction lower than the predetermined value and the front wheel speed (FR) has reached to the peak wheel speed in the first determination unit M1, and that the difference between the front wheel speed (FR) and the rear wheel speed is less than the predetermined speed in the second determination unit M2, an asynchronous control unit M3 prohibits the braking force controller M4 from synchronously controlling the braking force applied to the front road wheels FR, FL. Consequently, the road wheels FR, FL will not rotate synchronously, so that an appropriately estimated vehicle speed is obtained.

Figure 2:
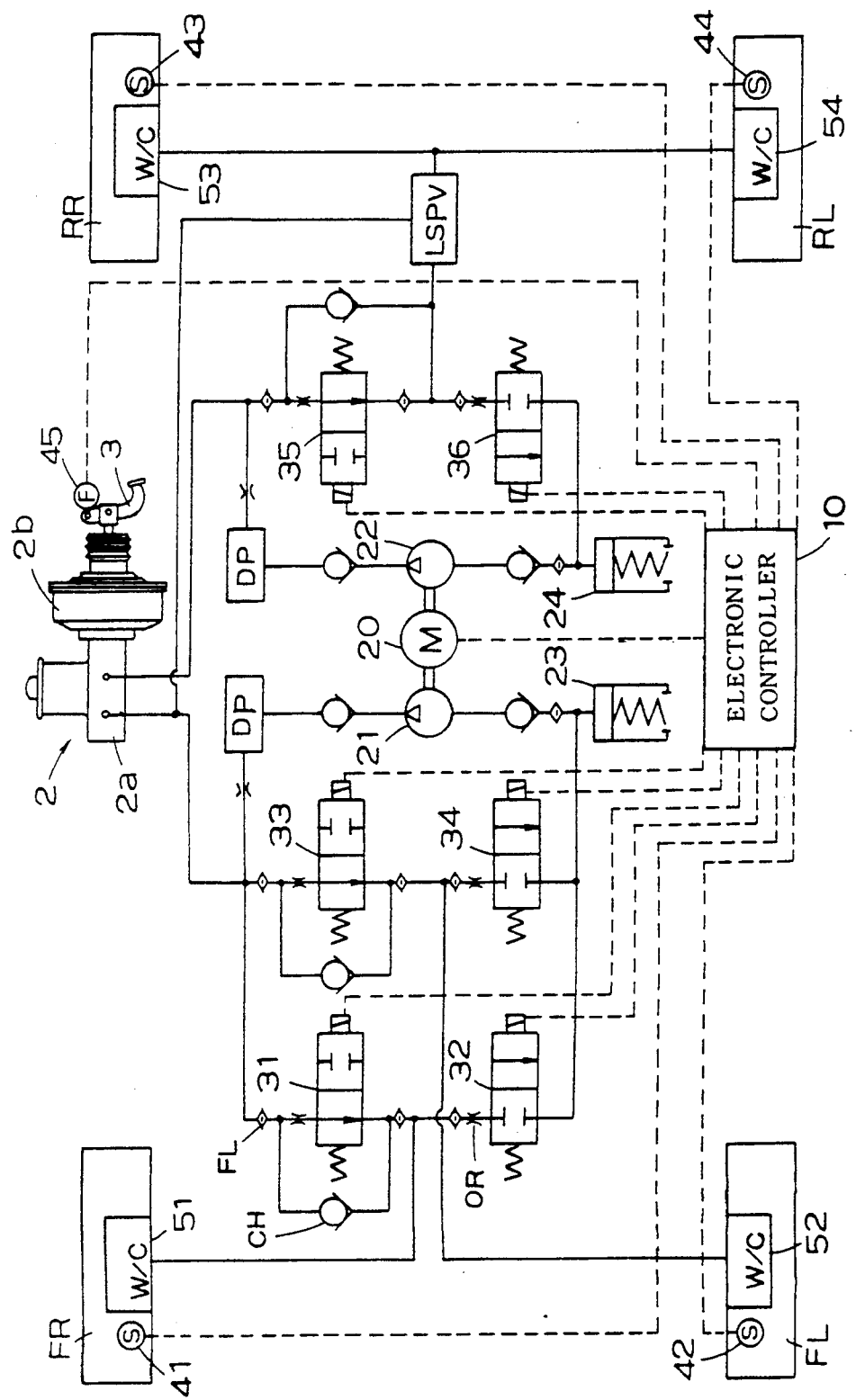
FIG. 2 is a schematic block diagram of an anti-skid control system of an embodiment of the present invention.

More specifically, an embodiment of the present invention is illustrated in FIGS. 2 to 5. Referring to FIG. 2, pumps 21, 22, reservoir 23, 24 and solenoid valves 31 to 36 are disposed in hydraulic circuits for connecting a hydraulic pressure generator 2, which comprises a master cylinder 2a and a booster 2b operated in response to depression of a brake pedal 3, to wheel brake cylinders 51 to 54 operatively connected to road wheels FR, FL, RR, and RL, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side.

The solenoid valves 31, 32 and solenoid valves 33, 34 are disposed respectively in hydraulic circuits for connecting one output port of the master cylinder 2a to the wheel brake cylinders 51, 52, and the pump 21 is disposed between the master cylinder 2a and the solenoid valves 31 to 34. Similarly, the solenoid valves 35, 36 are disposed respectively in hydraulic circuits for connecting the other output port of the master cylinder 2a to the wheel brake cylinders 53, 54, and the pump 22 is disposed between the master cylinder 2a and the solenoid valves 35, 36. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35. The hydraulic circuits at the drain side of the normally closed solenoid valves 32, 34 are connected to the pump 21 through the reservoir 23, and the hydraulic circuit at the drain side of the solenoid valve 36 is connected to the pump 22 through the reservoir 24. Each of the reservoirs 23, 24 is provided with a piston and a spring, and functions so as to store the brake fluid returned from each of the solenoid valves 32, 34, 36 through the hydraulic circuits at the drain side thereof, and to supply the brake fluid to each of those solenoid valves when the pumps 21, 22 operate.

Each of the solenoid valves 31 to 36 is a two ports-two positions solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves CH shown in FIG. 2 permit the brake fluid to return from each of the wheel brake cylinders 51 to 54 and the reservoirs 23, 24 to the hydraulic pressure generator 2, and blocks the counterflow of the brake fluid. In FIG. 2, FL denotes a filter, OR denotes an orifice, and DP denotes a damper. These have been known, so that the explanation thereof is omitted. The damper DP for preventing a pulsation of hydraulic pressure caused in the hydraulic circuits is not necessarily required to be disposed in the hydraulic circuits in a certain design.

LSPV denotes a load sensing proportioning valve which is provided for obtaining an ideal braking force distribution between front and rear road wheels and especially for varying a hydraulic pressure at a break point in response to a rear axle load. Its structure has been known, so that the explanation thereof is omitted.

Accordingly, with each of the solenoid valves 31 to 36 energized or de-energized, the hydraulic braking pressure in each of the wheel brake cylinders 51 to 54 is decreased, held or increased. Namely, when the current is not fed to the solenoid coil of each of the solenoid valves 31 to 36, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33, 35, the hydraulic braking pressure in each wheel brake cylinder is held. As the solenoid valves 31 to 36, there may be employed three ports-two positions solenoid operated valves of a half number of the valves 31 to 36.

The above-described solenoid valves 31 to 36 are connected to the electronic controller 10 which controls the operation of the solenoid valves 31 to 36. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor. As for the rear road wheels RR, RL, the wheel speed sensors 43, 44 may be omitted. In stead, a single wheel speed sensor may be disposed at a differential gear (not shown) for example, to detect a rear wheel speed commonly used for the road wheels RR, RL. There is also provided a brake switch 45 which is turned on when the brake pedal 3 is depressed, and turned off when the brake pedal 3 is released, and which is electrically connected to the electronic controller 10.

Figure 3:
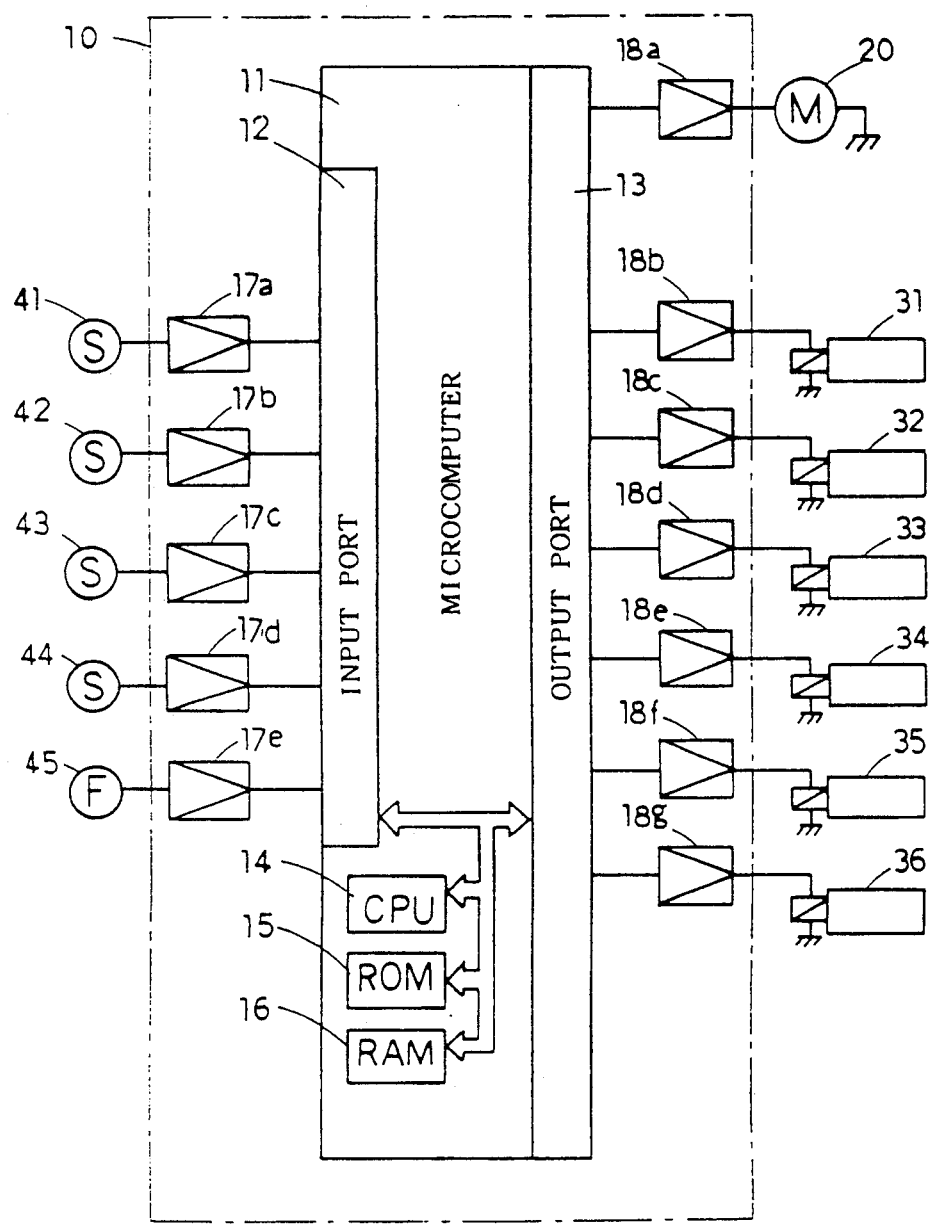
FIG. 3 is a block diagram illustrating the arrangement of the electronic controller shown in FIG. 2.

As shown in FIG. 3, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signals detected by each of the wheel speed sensors 41 to 44 and the brake switch 45 are fed to the input port 12 via respective amplification circuits 17a to 17e and then to the CPU 14. Then, a control signal is output from the output port 13 to the electric motor 20 via a drive circuit 18a, and control signals are output to the solenoid valves 31 to 36 via the respective drive circuits 18b to 18g.

Figure 4:
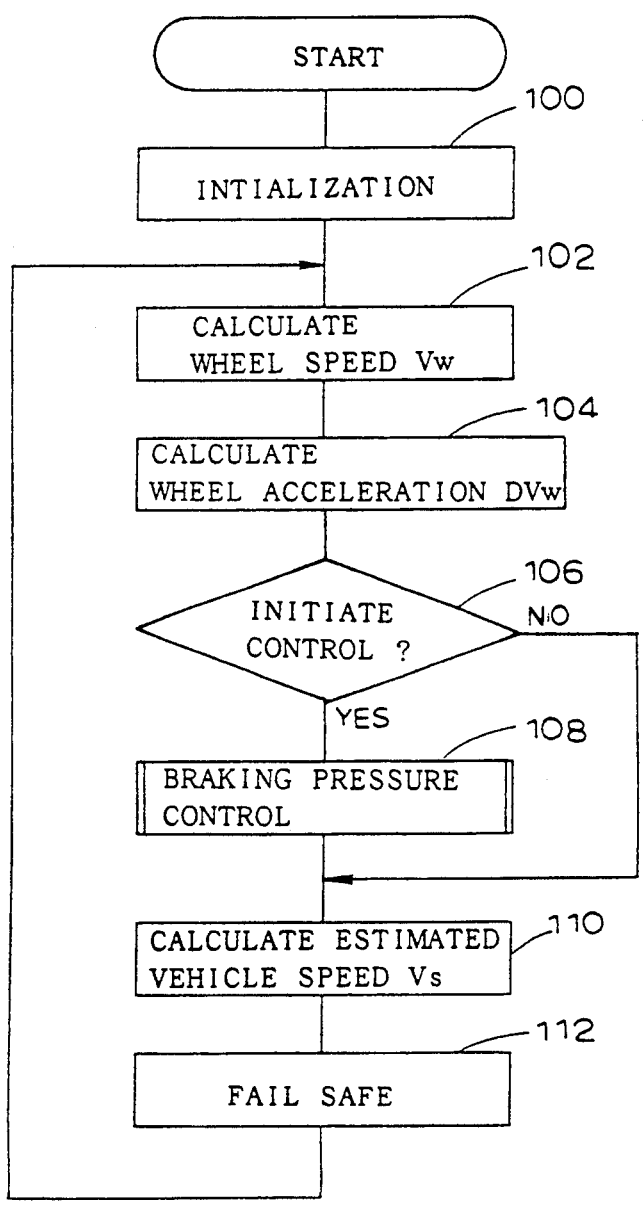
FIG. 4 is a flowchart showing the operation of the braking force control of the electronic controller according to an embodiment of the present invention.

A program routine executed by the electronic controller 10 for the anti-skid control will now be described with reference to FIGS. 4 and 5. FIG. 4 is a flowchart showing a main routine executed in accordance with a program of one embodiment of the present invention, which program is executed repeatedly at intervals of a predetermined period of time.

The program routine in FIG. 4 starts when a power source is turned on, and provides for initialization of the system at Step 100, wherein an estimated vehicle speed Vs which corresponds to the value representing a vehicle speed, a wheel speed Vw and a wheel acceleration DVw of each road wheel are set to zero. Then, the program proceeds to Step 102 where the wheel speed Vw detected by each of the wheel speed sensors 41 to 44 is read in the microcomputer 11. The estimated vehicle speed Vs is calculated as follows. A vehicle speed in braking operation is set to a value calculated on the assumption that the vehicle speed is reduced with a predetermined deceleration from the vehicle speed corresponding to the wheel speed in braking operation, and then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed. That is, the estimated vehicle speed Vs is set in accordance with the maximum value of the wheel speeds. Next, at Step 106, locking condition of each road wheel is determined in accordance with the output of the brake switch 45, the wheel speed Vw and wheel acceleration DVw, and the condition for initiating the anti-skid control is determined. If it is determined that the initiating condition is satisfied, the program proceeds to Step 108, otherwise it proceeds to Step 110. At Step 108, the solenoid valves 31-36 are energized or de-energized depending upon the locking condition of each road wheel, so that the hydraulic braking pressure in the wheel braking cylinders 51-54 is increased or decreased. The aforementioned routine will be repeated, until those for all the road wheels are completed. Then, the program proceeds to Step 110 where the estimated vehicle speed Vs is calculated. After a fail-safe procedure is executed at Step 112, the program returns to Step 102.

Figure 5:
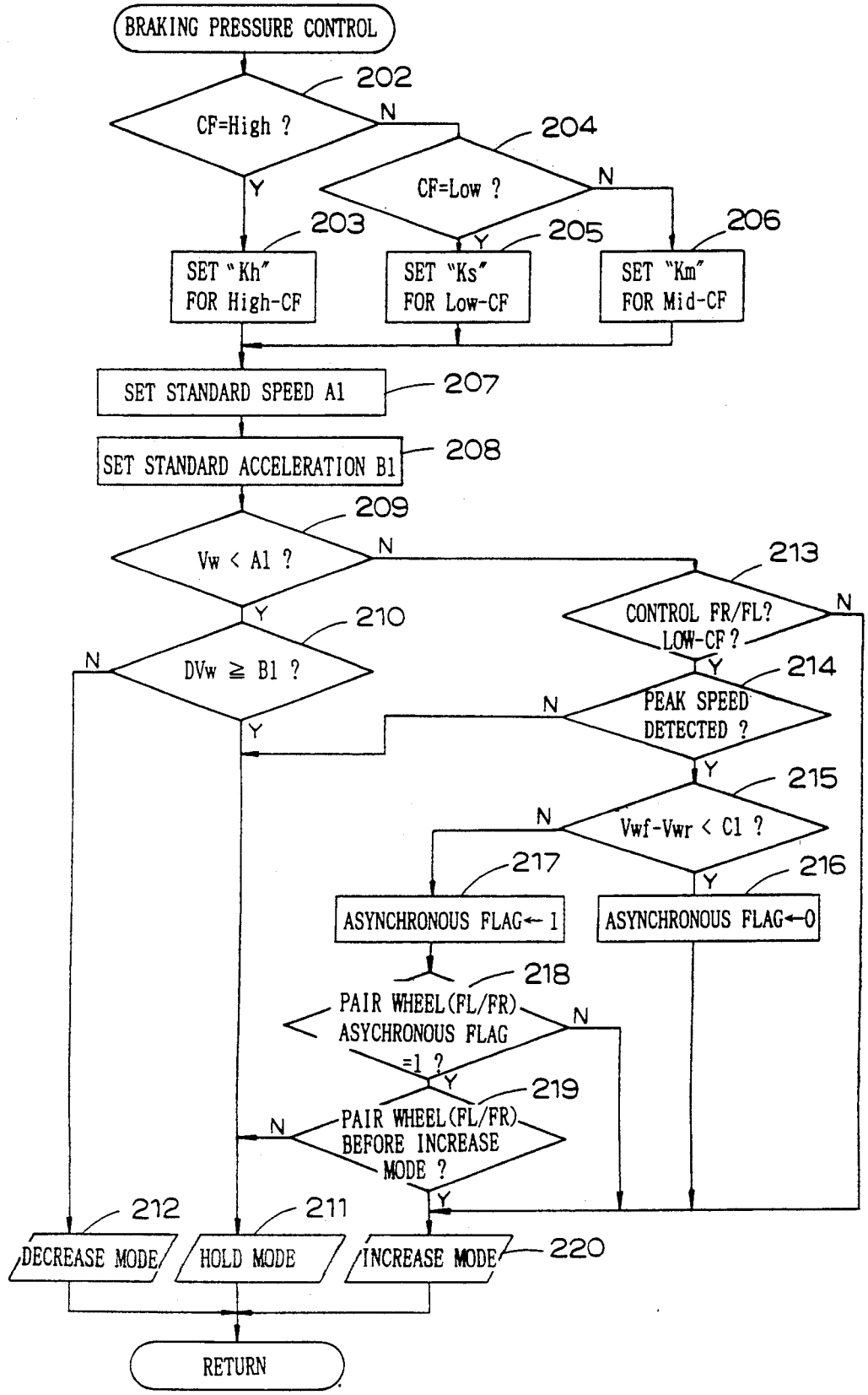
FIG. 5 is a flow chart of the braking pressure control in the braking force control according to the above embodiment.

FIG. 5 shows a subroutine of Step 108 in FIG. 4 for the control of the hydraulic braking pressure, which will be described hereinafter. In FIG. 5, "Y" represents "Yes" and "N" represents "No". At the outset, the coefficient of friction of a road on which the vehicle is running is determined at Step 202 and 204. That is, by comparing the wheel acceleration DVw with a predetermined value, for example, it is determined whether the coefficient of friction of the road (hereinafter simply referred to as road CF) corresponds to a certain high value of coefficient of friction (hereinafter referred to as high-CF) higher than a predetermined value, or not. If the road CF is determined to correspond to the high-CF, the program proceeds to Step 203 where a constant "Kh" for the high-CF is set. If it is not, the program proceeds to Step 204 where it is determined whether the road CF corresponds to a certain low value of coefficient of friction (hereinafter referred to as low-CF) lower than another predetermined value, or not. If it is determined to correspond to the low-CF, a constant "Ks" for the low-CF is set at Step 205, otherwise a constant "Km" for a certain value between the high value and low value of coefficient of friction (hereinafter referred to as mid-CF) is set at Step 206. Then, at Steps 207 and 208, a standard speed A1 and standard acceleration B1 are set in accordance with those constants Kh, Km, Ks. Then, the program proceeds to Step 209 where the wheel speed Vw is compared with the standard speed A1. If the wheel speed Vw is less than the standard speed A1, the program proceeds to Step 210 where the wheel acceleration DVw is compared with the standard acceleration B1. When it is determined at Step 210 that the wheel acceleration DVw is equal to or greater than the standard acceleration B1, a hold mode signal is output at Step 211. On the contrary, when it is determined that the wheel acceleration DVw is less than the standard acceleration B1, a decrease mode signal is output at Step 212 and the program returns to the main routine.

If it is determined that the wheel speed Vw is equal to or greater than the standard speed A1 at Step 209, the program proceeds to Step 213. At step 213, it is determined whether the presently operating control is being executed with respect to either one of the front road wheels FR and FL, and the road CF has been determined to be the low-CF. If the result is negative, the program proceeds to Step 220 where an increase mode signal is output. With respect to one of the front road wheels FR (or FL), in the case where it has been determined that the road CF is the low-CF (at Step 205), the program proceeds to Step 214 where it is determined whether a peak wheel speed has been detected or not. If the wheel speed of the road wheel FR has not reached to the peak wheel speed, the program proceeds to Step 211 where the hold mode signal is output. If the peak wheel speed has been detected, then the program proceeds to Step 215 where a difference between a wheel speed Vwfr (or Vwfl) of one of the front road wheels FR (or FL) and a wheel speed Vwr representative of wheel speeds of the rear road wheels RR, RL (e.g., an average wheel speed thereof) is compared with a predetermined value Cl. If the difference is less than the predetermined value Cl, the program proceeds to Step 216 where an asynchronous flag is reset (to "0"), and further proceeds to Step 220. If the difference is equal to or greater than the predetermined value Cl, the program proceeds to Step 217 where the asynchronous flag is set (to "1"), and then proceeds to Step 218.

At Step 218, it is determined whether the asynchronous flag has been set with respect to the other road wheel FL (or FR) which pairs with the road wheel FR (or FL) under control in this routine. Unless it has been set, the program proceeds to Step 220. If the flag has been set, it is determined at Step 219 whether the increase mode signal has been output with respect to the other road wheel FL (or FR). If it has been output, the hold mode signal is output at Step 211, whereas if it has not been output, the increase mode signal is output at Step 220. That is, it is so controlled that if the increase mode signal has been output to one of the front road wheels FR, FL, the hold mode signal is output to the other, so that the braking force control is not synchronously performed with respect to the front road wheels FR, FL (in other words, it is performed asynchronously).

Figure 6:
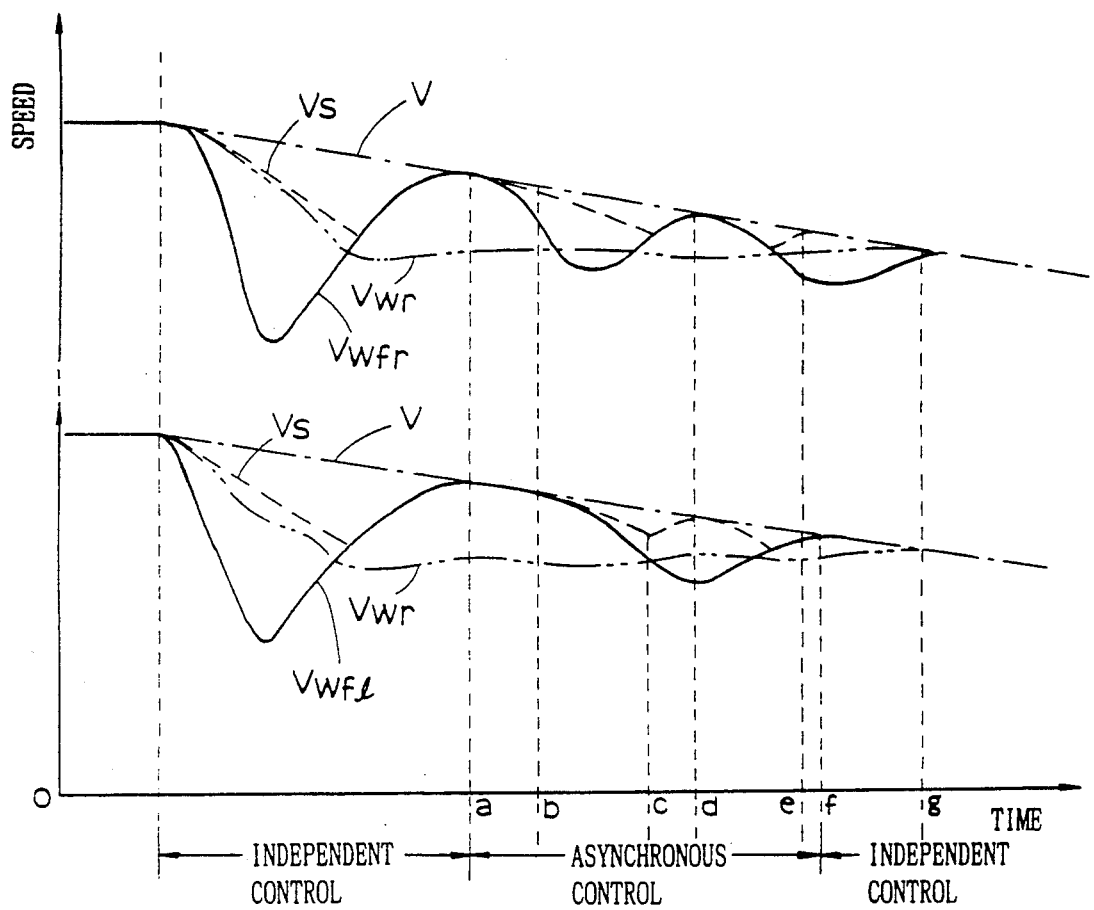
FIG. 6 is a diagram showing the variation of wheel speeds during the anti-skid operation in the above embodiment.
Figure 7:
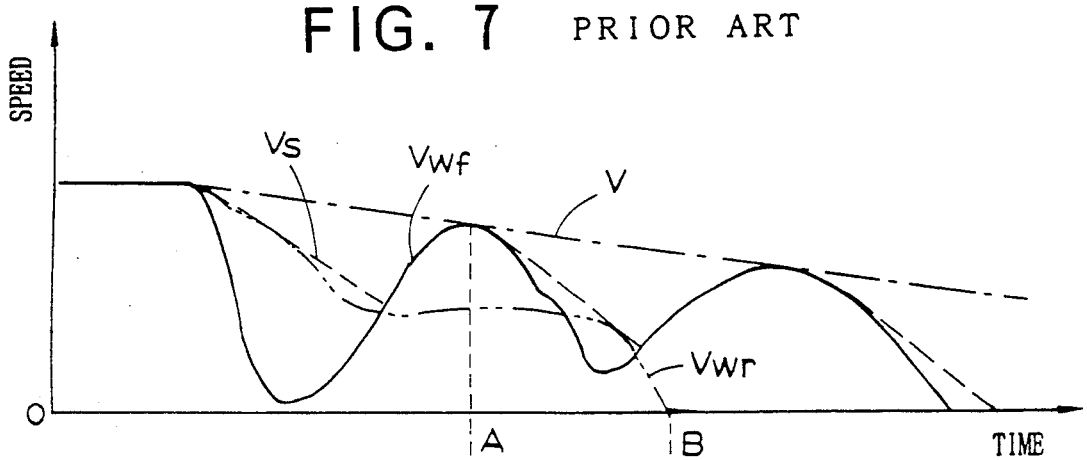
FIG. 7 is a diagram showing the variation of wheel speeds during the anti skid operation in the prior art.

FIG. 6 illustrates an example of anti-skid control in braking operation, where a solid line shown in the upper portion indicates the wheel speed Vwfr of the right front road wheel FR and a solid line shown in the lower portion indicates the wheel speed Vwfl of the left front road wheel FL. Further, each two dotted-chain line indicates the wheel speed Vwr, one dotted-chain line indicates the actual vehicle speed V, and broken line indicates the estimated vehicle speed Vs. In FIG. 6, the independent control is performed in a region from the start of the anti-skid control to a position "a", and a region following a position "f", whereas the asynchronous control is performed in a region between the positions "a" and "f".

At the position "a", the increase mode signal is output, e.g., in the form of a pulse increase mode signal, with respect to the right front road wheel FR (in the upper portion of FIG. 6), whereas the hold mode signal is output irrespective of the situation where the increase mode signal is allowed to be output with respect to the left front road wheel FL (in the lower portion of FIG. 6), so that the hydraulic braking pressure control is performed in accordance with different modes between the road wheels FR and FL. Thereafter, the decrease mode signal is output for the control of the road wheel FR at a position "b", the pulse increase mode signal is output for the control of the road wheel FL, and the decrease mode signal is output for the control of the road wheel FL at a position "c". With respect to the road wheel FR, the pulse increase mode signal is output at a position "d", and the decrease mode signal is output at a position "e". And, the pulse increase mode signal is output for the control of the road wheel FL at a position "f" to provide the independent control thereafter, and the pulse increase mode signal is output at a position "g" for the control of the road wheel FR.

As described above, the output timing of the increase mode signal with respect to the front road wheels FR, FL is so arranged that the hydraulic braking pressure in the wheel brake cylinder 51 or 52 is not increased until the peak wheel speed is detected. When the peak wheel speed is detected with respect to one of the front road wheels FR, FL (e.g. FR), it is presumed that the wheel speed (Vwfr) has been recovered almost to reach the actual vehicle speed. Therefore, if the difference between the wheel speed (Vwfr) and the wheel speed Vwr of the rear road wheels RR, RL is equal to or greater than the predetermined value Cl, the asynchronous flag is set for the road wheel FR (or FL). If the difference between the wheel speed (Vwfl) of the other road wheel FL and the wheel speed Vwr is equal to or greater than the predetermined value Cl, the asynchronous flag is set for the road wheel FL. Then, the hydraulic braking pressures in the wheel brake cylinders 51, 52 of the road wheels FR, FL are controlled asynchronously each other. That is, in order to prevent the increase mode signal from being output simultaneously for the control of both front road wheels FR and FL, if the increase mode signal has been output for the control of one road wheel FR (or FL), the increase mode signal is not output for the control of the other road wheel FL (or FR), but the hold mode signal is output therefor.

Accordingly, in the case where the front road wheels FR, FL are on the low-CF road, even if the difference between the wheel speed Vwfr or Vwfl of either one of the road wheels FR, FL and the wheel speed Vwr of the rear road wheels RR, RL which tend to be locked, has become more than the predetermined value Cl, the wheel speeds Vwfr, Vwfl of the front road wheels FR, FL are not decreased simultaneously. Rather, an appropriate estimated vehicle speed is obtained. Thus, the rear road wheels RR, RL are prevented from being locked repidly. While the above-described embodiment is the one applied to the anti-skid control system for use in the rear two-wheel drive vehicle, the system may be used for a four-wheel drive vehicle by providing the front road wheels with the asynchronous control, and providing the rear road wheels with the low-select control.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle for driving right and left road wheels at a rear side of said vehicle, comprising:

wheel brake cylinders operatively connected to right and left road wheels, respectively, at front and rear sides of said vehicle for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for individually controlling the hydraulic braking pressure in each of said wheel brake cylinders;

wheel speed detecting means for detecting a front wheel speed of each of said front road wheels and a rear wheel speed representative of wheel speeds of said rear road wheels, and providing output signals corresponding to said front wheel speed and rear wheel speed;

braking force control means for controlling said actuating means in response to said output signal of said wheel speed detecting means to control the braking force applied to said road wheels;

first determination means for determining if at least one of said front road wheels is on a road surface of a coefficient of friction lower than a predetermined value and determining if the front wheel speed of one of said front road wheels has reached to a peak wheel speed;

second determination means for determining if a difference between said front wheel speed and said rear wheel speed is less than a predetermined speed; and asynchronous control means for prohibiting said braking force control means from synchronously controlling the braking force applied to said front road wheels, when said first determination means determines that at least one of said front road wheels is on a road surface of the coefficient of friction lower than the predetermined value and that the wheel speed of one of said front road wheels has reached to the peak wheel speed, and said second determination means determines that a difference between said front wheel speed and said rear wheel speed is less than the predetermined speed.

2. An anti-skid control system according to claim 1, wherein said asynchronous control means makes said braking force control means to control said actuating means to hold the hydraulic braking pressure in the wheel brake cylinder operatively connected to one of said front road wheels, until said actuating means terminates increasing the hydraulic braking pressure in the wheel brake cylinder operatively connected to the other of said front road wheels.

3. An anti-skid control system according to claim 1, wherein said rear wheel speed is an average of the wheel speeds of said rear road wheels.

4. An anti-skid control system according to claim 1, wherein said rear wheel speed is a rotational speed of an axle of said rear road wheels.

* * * * *